United States Patent

Okinoshima et al.

[11] Patent Number: 6,069,186
[45] Date of Patent: May 30, 2000

[54] RADIATION-CURABLE SILICONE RUBBER COMPOSITION

[75] Inventors: Hiroshige Okinoshima; Tsutomu Kashiwagi; Shinsuke Yamaguchi, all of Annaka, Japan

[73] Assignee: Shin-Etsu Chemical Co., Ltd., Tokyo, Japan

[21] Appl. No.: 09/212,862

[22] Filed: Dec. 17, 1998

[30] Foreign Application Priority Data

Jan. 8, 1998 [JP] Japan .................................. 10-013296
Feb. 17, 1998 [JP] Japan .................................. 10-051393

[51] Int. Cl.$^7$ ............................. C08F 30/08; C08G 77/20
[52] U.S. Cl. .............................. 522/42; 522/99; 522/64; 528/32; 528/34; 528/18
[58] Field of Search ................. 522/42, 64, 99; 528/32, 34, 18

[56] References Cited

U.S. PATENT DOCUMENTS

| | | | |
|---|---|---|---|
| 5,075,349 | 12/1991 | Ohba et al. | 522/99 |
| 5,212,211 | 5/1993 | Welch, II et al. | 522/37 |
| 5,397,814 | 3/1995 | Aoki et al. | 522/99 |
| 5,494,979 | 2/1996 | Ebbrecht et al. | 525/479 |

*Primary Examiner*—Margaret G. Moore
*Attorney, Agent, or Firm*—Oblon, Spivak, McClelland, Maier & Neustadt, P.C.

[57] ABSTRACT

A radiation-curable silicone rubber composition is provided which includes:

(A) a specific organopolysiloxane having radiation-sensitive (meth)acryloyl groups at the both terminals of the molecular chain, (B) a photosensitizer;

(C) a tetraalkoxysilane or a partial hydrolysis-condensation product thereof; and (D) optionally together with a specific organic titanium compound. This composition is curable upon irradiation by ultraviolet rays for a short time and exhibits adhesion quickly. Hence, it is useful for the bonding, coating and potting of various substrates. This composition also has a relatively weak adhesion immediately after curing, and can be peeled from the substrate with ease for a while. Hence, it is also suited for uses where repair is required. Because of a high curing rate, it can be effective for, e.g., making a process short, improving productivity and saving energy in the manufacture of electric and electronic parts.

20 Claims, No Drawings

RADIATION-CURABLE SILICONE RUBBER COMPOSITION

BACKGROUND OF THE INVENTION

1. Field of the Invention

This invention relates to a radiation-curable silicone rubber composition which can form cured products having a superior adhesion.

2. Description of the Prior Art

Japanese Patent Publication (kokoku) No. 4-25231 (corresponding to U.S. Pat. No. 4,733,942 and U.S. Reissue Pat. No. 33,737) discloses a rubber composition having good properties as a coating material for optical fibers. This composition comprises an organopolysiloxane containing a vinyl functional group, and a photopolymerization initiator. It has better thermal resistance, humidity resistance, electrical properties and curability than compositions having been available at that time which are composed basically of an organic-compound resin or a silicone-modified resin, but has so low an adhesion to substrates that it has not been usable as general-purpose adhesives or as coating materials, adhesives and potting materials for electric and electronic uses.

SUMMARY OF THE INVENTION

Accordingly, a subject of the present invention is to provide a radiation-curable silicone rubber composition which is immediately curable upon irradiation by ultraviolet rays for a short time and shows a good adhesion to various substrates.

The present invention provides, as what can settle such a subject, a radiation-curable silicone rubber composition comprising;

(A) an organopolysiloxane represented by the general formula (1):

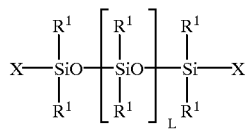
(1)

wherein $R^1$'s are independently a substituted or unsubstituted monovalent hydrocarbon group having 1 to 9 carbon atoms; and X's are independently an organosilicon group represented by the general formula (2):

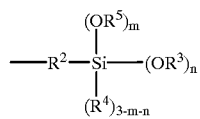
(2)

wherein $R^2$ is a divalent hydrocarbon group having 2 to 4 carbon atoms or an oxygen atom; $R^3$ is a monovalent organic group having 4 to 25 carbon atoms, having 1 to 3 acryloyl or methacryloyl groups represented by the general formula:

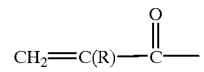

wherein R is a hydrogen atom or a methyl group; $R^4$ is a substituted or unsubstituted monovalent hydrocarbon group having 1 to 9 carbon atoms; $R^5$ is a monovalent hydrocarbon group having 1 to 18 carbon atoms; n is an integer of 1 to 3, m is an integer of 0 to 2, and 1>n+m>3, provided that $R^3$ has a plurality of acryloyl or methacryloyl groups when n is 1; L is an integer of 8 to 10,000; and $R^3$ (inclusive of R), $R^4$ and $R^5$ which are each present in plurality may each be the same or different;

(B) a photosensitizer; and (C) at least one organosilicon compound selected from an alkoxysilane represented by the general formula: $Si(OR^6)_4$ wherein $R^6$ is an alkoxy-substituted or unsubstituted alkyl group having 1 to 4 carbon atoms;

and a partial hydrolysis-condensation product thereof.

The composition of the present invention is curable upon irradiation with a radiation, for example, ultraviolet rays for a short time and exhibits adhesion quickly. Hence, it is useful for the bonding, coating and potting of various substrates. Also, because of a high curing rate, it can be effective for, e.g., making a process short, improving productivity and saving energy in the manufacture of electric and electronic parts. The composition of the present invention also has a relatively weak adhesion immediately after curing, and can be peeled from the substrate with ease for a while. Hence, it is also suited for uses where repair is required.

DETAILED DESCRIPTION OF THE PREFERRED EMBODIMENTS

The present invention will be described below in detail. The terminologies of "(meth)acryloyl", "(meth)acrylic", "(meth)acrylate" and the like used herein embrace acryloyl and methacryloyl, acrylic and methacrylic, acrylate and methacrylate, and the like, respectively; and Me means a methyl group, Et an ethyl group, Pr a propyl group, and iPr an isopropyl group.

(A) Organopolysiloxane

In the general formula (1), $R^1$'s may be the same or different and are each a substituted or unsubstituted monovalent hydrocarbon group having 1 to 9 carbon atoms, and preferably 1 to 6 carbon atoms. As specific examples of this monovalent hydrocarbon group, it may include alkyl groups such as a methyl group, an ethyl group, a propyl group, an isopropyl group, a butyl group, an isobutyl group, a tert-butyl group, pentyl group, a hexyl group, a heptyl group, a 2-ethylhexyl group, an octyl group and a nonyl group; cycloalkyl groups such as a cyclohexyl group and a cycloheptyl group; alkenyl groups such as a vinyl group, an allyl group, a propenyl group, an isopropenyl group, a butenyl group and a hexenyl group; aryl groups such as a phenyl group and tolyl group; aralkyl groups such as a benzyl group, a phenylethyl group and a phenylpropyl group; and any of these the hydrogen atoms bonded to the carbon atom of which have been substituted at least in part with a substituent such as a halogen atom or a cyano group, as exemplified by a chloromethyl group, a cyano ethyl group and a trifluoropropyl group. Those in which 50 mol % or more of $R^1$'s is held by methyl groups and 25 mol % or less by phenyl groups are preferred.

In the general formula (1), X's may be the same or different and are each a group represented by the general formula (2). $R^2$ in the general formula (2) is a divalent hydrocarbon group having 2 to 4 carbon atoms or an oxygen atom. In view of water resistance, it may preferably be the divalent hydrocarbon group. As specific examples of this divalent group, it may include alkylene groups such as an ethylene group a propylene group a methylethylene group and tetramethylene group. An ethylene group is preferred.

$R^3$ in the general formula (2) is a monovalent organic group having 4 to 25 carbon atoms, having 1 to 3, preferably 2 or 3, and more preferably 3 (meth)acryloyl groups, for example, as (meth)acryloyloxy groups. The (meth)acryloyl group may include $CH_2$=CHCO— and $CH_2$=C($CH_3$)CO—. The organic group having this (meth)acryloyl group may include alkyl groups having 1 to 10 carbon atoms, preferably 2 to 6 carbon atoms, substituted with 1 to 3 acryloyloxy groups or methacryloyloxy groups, as exemplified by $CH_2$=CHCOOCH$_2$CH$_2$—, [$CH_2$=C($CH_3$)COOCH$_2$]$_3$C—CH$_2$—, ($CH_2$=CHCOOCH$_2$)$_3$C—CH$_2$—, ($CH_2$=CHCOOCH$_2$)$_2$C($C_2H_5$)CH$_2$—,

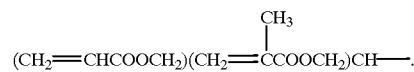

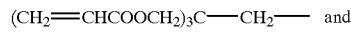

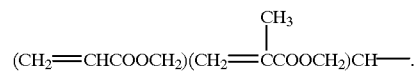

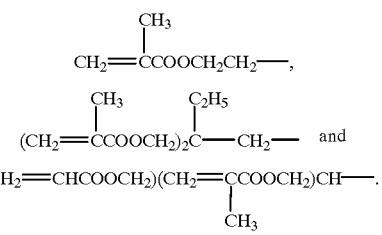

Preferred are [$CH_2$=C($CH_3$)COOCH$_2$]$_3$C—CH$_2$—, ($CH_2$=CHCOOCH$_2$)$_3$C—CH$_2$—, ($CH_2$=CHCOOCH$_2$)$_2$C($C_2H_5$)CH$_2$—, and ($CH_2$=CHCOOCH$_2$)($CH_2$=CCOOCH$_2$)CH—.
 $\quad\quad\quad\quad\quad\quad\quad\quad\quad\quad\quad$ |
 $\quad\quad\quad\quad\quad\quad\quad\quad\quad\quad\quad$ CH$_3$ More preferred are [$CH_2$=C($CH_3$)COOCH$_2$]$_3$C—CH$_2$—, ($CH_2$=CHCOOCH$_2$)$_3$C—CH$_2$— and ($CH_2$=CHCOOCH$_2$)($CH_2$=CCOOCH$_2$)CH—.
 $\quad\quad\quad\quad\quad\quad\quad\quad\quad\quad\quad$ |
 $\quad\quad\quad\quad\quad\quad\quad\quad\quad\quad\quad$ CH$_3$ $R^4$ in the general formula (2) is a substituted or unsubstituted monovalent hydrocarbon group having 1 to 9 carbon atoms, and preferably 1 to 6 carbon atoms. As specific examples of the monovalent hydrocarbon group represented by $R^4$, it may include those exemplified for the $R^1$ in the general formula (1). Like the case of $R^1$, those in which 50 mol % or more of $R^4$ is held by methyl groups and 25 mol % or less by phenyl groups are preferred. $R^5$ in the general formula (2) is a monovalent hydrocarbon group having 1 to 18 carbon atoms, and preferably 1 to 8 carbon atoms. As specific examples of the monovalent hydrocarbon group represented by $R^5$, it may include alkyl groups such as a methyl group, an ethyl group, a propyl group, a butyl group, a pentyl group and a neopentyl group; cycloalkyl groups such as a cyclohexyl group; aryl groups such as a phenyl group; and alkenyl groups such as an allyl group, a propenyl group and a butenyl group, and those excluding aliphatic unsaturated groups such as an alkenyl group may preferably be used. In the general formula (2), n is an integer of 1 to 3 and m is an integer of 0 to 2, satisfying 1>n+m>3, provided that $R^3$ has a plurality of, particularly two or three, (meth)acryloyl groups when n is 1.

The substituents $R^3$, $R^4$ and $R^5$ which are each present in plurality may each be the same or different.

In the general formula (1), L is an integer of 8 to 10,000, and preferably 48 to 1,000.

Preferred specific examples of the organopolysiloxane represented by the general formula (1), include the compounds represented by the following formulas:

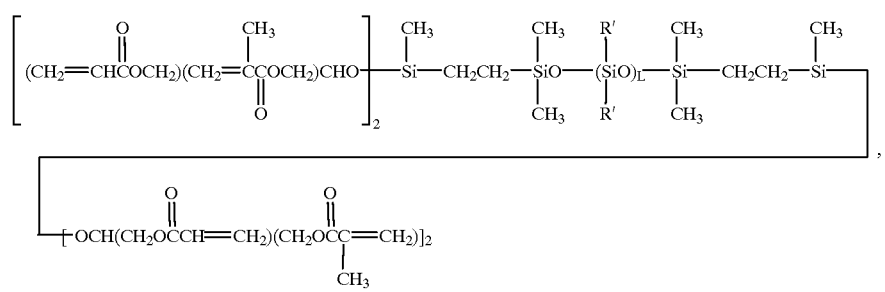

-continued
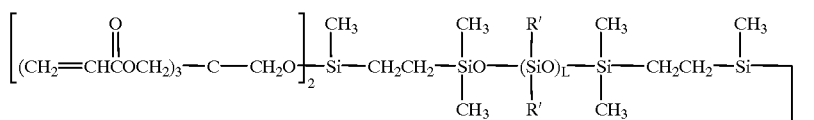
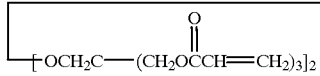
(1-2)
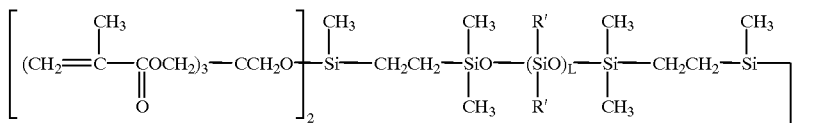
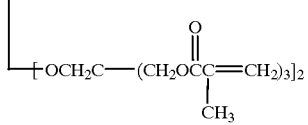
(1-3)
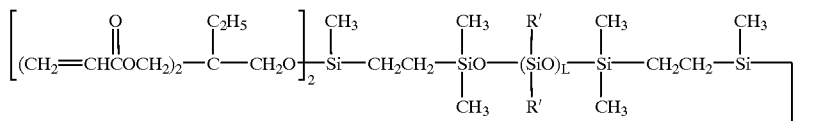
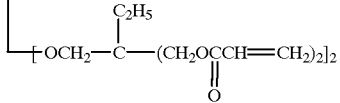
(1-4)
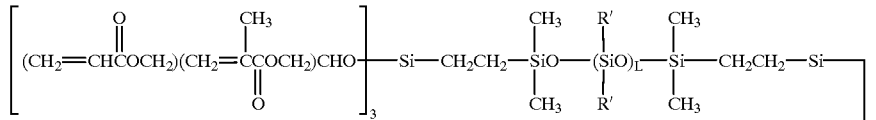
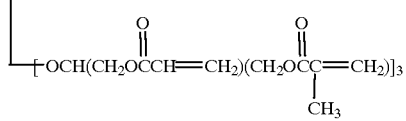
(1-5)
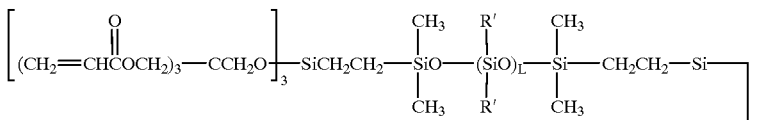
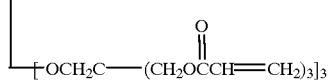
(1-6)

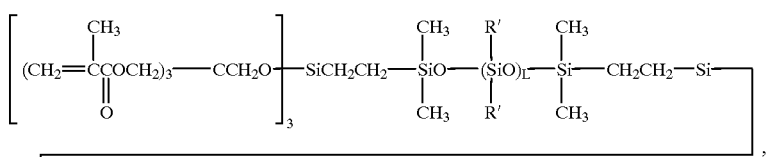
(1-7)
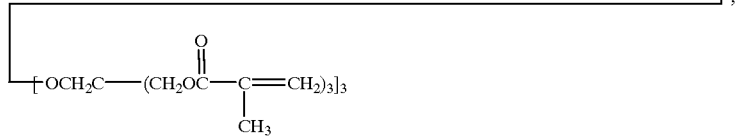
(1-8)
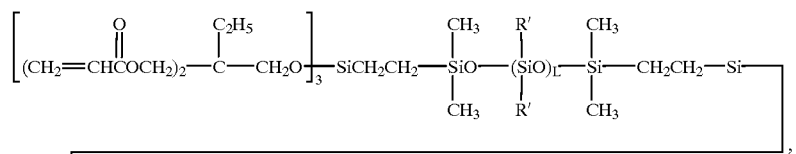
(1-9)
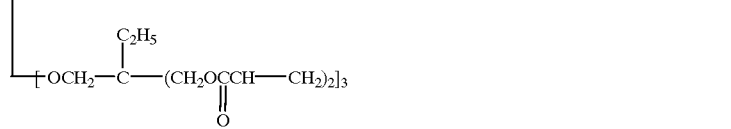
(1-10)
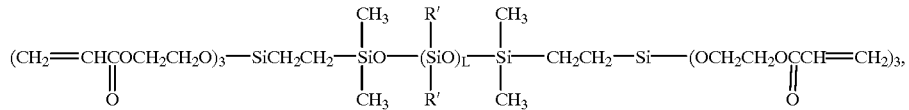
(1-11)
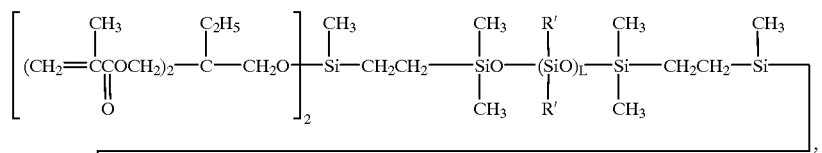
(1-12)
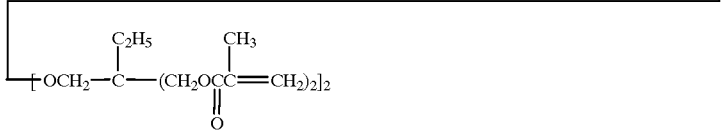
(1-13)
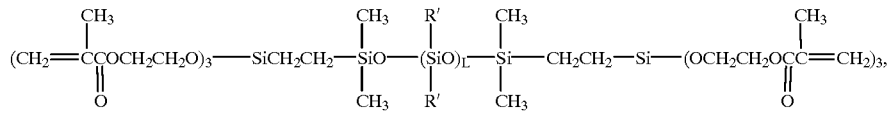
(1-14)

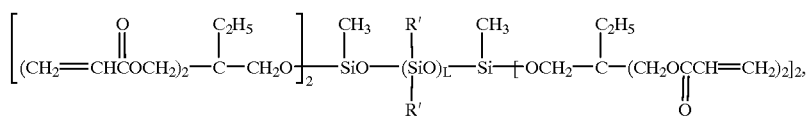
(1-15)

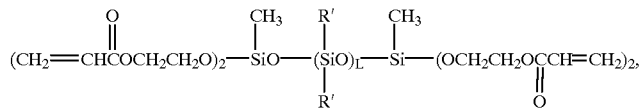
(1-16)

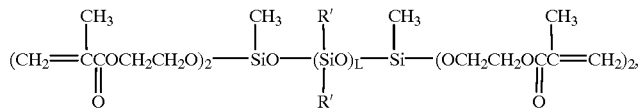
(1-17)

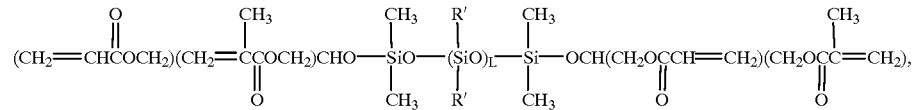
(1-18)

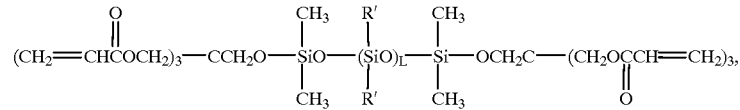
(1-19)

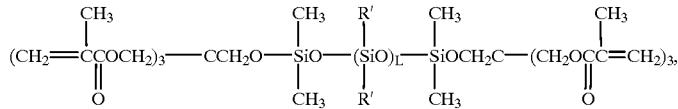
(1-20)

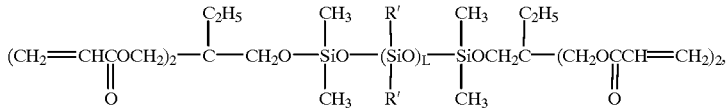
(1-21)

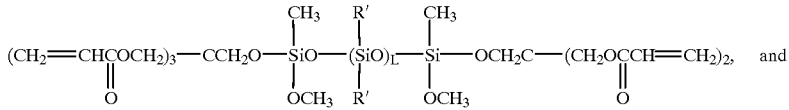
(1-22)

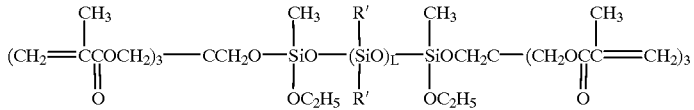
(1-23)

wherein in the formulas (1-1) to (1-23) R' represents a methyl group, phenyl group or 3,3,3-trofuluoropropyl group, and L is an integer of 8 to 10,000, preferably 48 to 1,000.

Any of these organopolysiloxanes may be used singly or in combination of two or more.

The component-(A) organopolysiloxane has $(OR^3)$ groups (i.e., has a plurality of, particularly 2 to 9, (meth) acryloyl groups at each of the both terminals of the molecular chain, and hence this stands readily sensitive when irradiated by radiations such as ultraviolet rays, far-ultraviolet rays, electron beam, X-rays and γ-rays, and makes the composition of the present invention cure.

The component-(A) organopolysiloxane can be obtained by, e.g., dehydrochlorination reaction between a corresponding chlorosiloxane and an (meth)acrylic functional group having an active hydroxyl group. This chlorosiloxane may include the compounds represented by the following formulas:

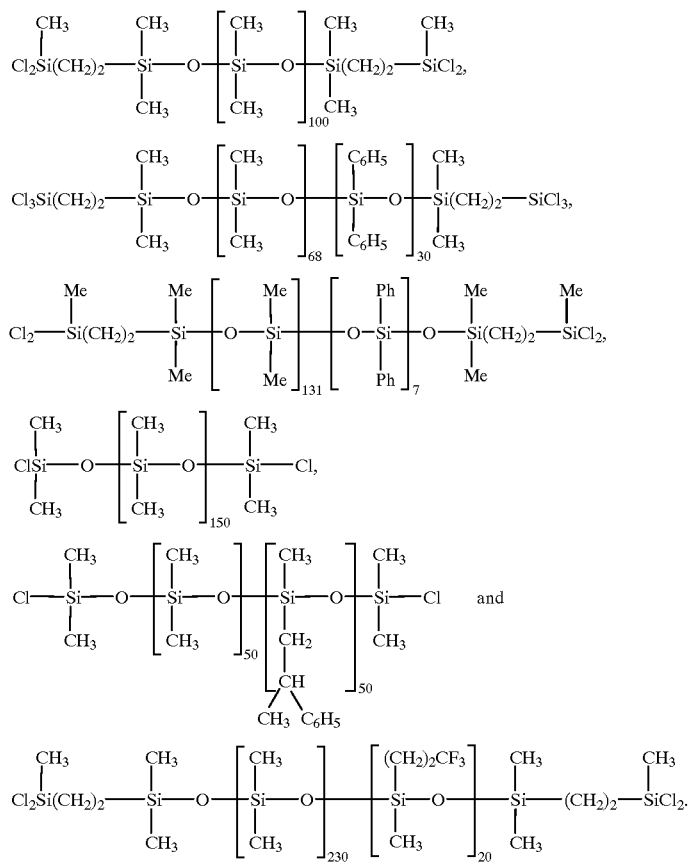

The (meth)acrylic functional group having an active hydroxyl group may include, e.g., 2-hydroxyethyl acrylate or methacrylate, methylolpropane diacrylate or -methacrylate, pentaerythritol triacrylate or -methacrylate, and 2-hydroxy-1-acryloyloxy-3-methacryloyloxypropane.

The component-(A) organopolysiloxane may preferably have a plurality of (meth)acryloyl groups on one silicon atom. Hence, from such a viewpoint, methylolpropane diacrylate or -dimethacrylate and pentaerythritol triacrylate or -trimethacrylate are preferred.

(B) Photosensitizer

There are no particular limitations on the photosensitizer, which may preferably be exemplified by benzoyl compounds or phenyl ketone compounds, which preferably have a hydroxyl group on the α-position carbon atom, such as benzophenone, phenyl 1-hydroxycyclohexyl ketone, 2-hydroxy-2-methyl-1-phenylpropan-1-one, and 1-(4-isopropylphenyl)-2-hydroxy-2-methylpropan-1-one; organophosphine oxide compounds such as 2,4,6-trimethylbenzoyldiphenylphosphine oxide, bisacylphosphine oxide and bis-(2,6-dimethoxybenzoyl)-2, 4,4-trimethylpentylphosphine oxide; benzoin ether compounds such as isobutylbenzoin ether; ketal compounds such as acetophenone diethyl ketal; thioxanthone compounds; and acetophenone compounds. Any of these may be used singly or in combination of two or more.

The component-(B) may usually be mixed in an amount of from 0.5 to 10 parts by weight, and preferably from 1.0 to 5.0 parts by weight, based on 100 parts by weight of the component-(A).

(C) Alkoxysilane and/or Partial Hydrolysis-condensation Product Thereof

The component-(C) alkoxysilane and/or partial hydrolysis-condensation product thereof is/are a tetraalkoxysilane represented by the general formula: $Si(OR^6)_4$ and/or a partial hydrolysis-condensation product thereof.

In the formula: $Si(OR^6)_4$, $R^6$ is a lower alkyl group, or an alkoxy-substituted lower alkyl group, having about 1 to 4 carbon atoms. As specific examples of this lower alkyl group, it may include a methyl group, an ethyl group, a propyl group, an isopropyl group, a butyl group, an isobutyl group and a tert-butyl group. The alkoxy-substituted lower alkyl group may include a methoxymethyl group, a methoxyethyl group, an ethoxymethyl group and an ethoxyethyl group. A methyl group and an ethyl group are preferred.

The partial hydrolysis-condensation product of the alkoxysilane refers to a siloxane compound (a siloxane oligomer containing about 2 to about 100 silicon atoms, preferably about 2 to about 30 silicon atoms) in the molecule of which at least one, and preferably two or more, alkoxyl group(s) remain, which is produced by hydrolytic condensation reaction of the alkoxyl group.

The component-(C) may be used singly or in combination of two or more.

The component-(C) may usually be mixed in an amount of from 0.5 to 10 parts by weight, and preferably from 1.0 to 5.0 parts by weight, based on 100 parts by weight of the component-(A).

(D) Organic Titanium Compound

In the composition of the present invention, at least one organic titanium compound, component-(D), may optionally be further mixed which is selected from a titanate compound and a titanium chelate compound.

The organic titanium compound is a compound which may be used in combination with the component-(C) adhesive so that the adhesion to various substrates can be exhibited immediately when the composition cures upon irradiation by ultraviolet rays. The titanate compound may be exemplified by titanates having an alkoxyl group having 1 to 8 carbon atoms, and preferably having 2 to 4 carbon atoms, such as tetramethyl titanate, tetraethyl titanate, tetrapropyl titanate, tetraisopropyl titanate, tetrabutyl titanate, tetraisobutyl titanate, tetrahexyl titanate and tetra(2-ethylhexyl) titanate, and besides titanates having a triorganosiloxyl group such as a trialkylsiloxyl group, an alkoxydialkylsiloxyl group, a trialkoxysiloxyl group or an alkyldialkoxysiloxyl group, e.g.; $(n—C_3H_7O)_3TiOSi(CH_3)(OC_3H_7)_2$, $(n—C_3H_7O)_3TiOSi(CH_3)_2(OC_3H_7)$, $[(CH_3)_3SiO]_3TiOSi(CH_3)_2(OC_3H_7)_2$, and $[(CH_3)_3SiO]_4Ti$.

The titanium chelate compound may include complexes having an acetylacetonato group as a ligand or a methyl acetate group or ethyl acetate group having an alkoxyl group in the ligand, and salts of any of these with an organosiloxane. Stated specifically, it may include the following:

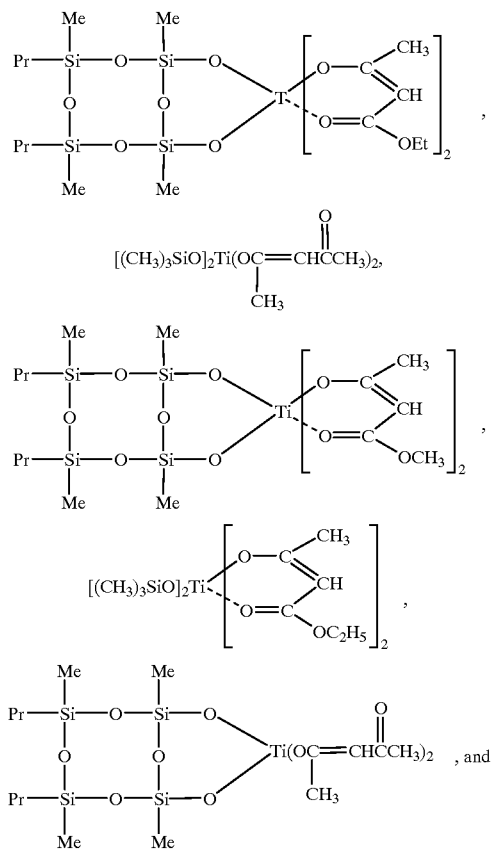

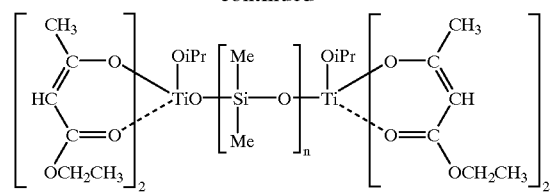

wherein n is an integer of 2 to 100.

The component-(D) may be used singly or in combination of two or more.

The component-(D) may be added in an amount of from 0 to 20 parts by weight, usually 0.001 to 20 parts by weight, particularly from 0.01 to 10 parts by weight, and more particularly from 0.1 to 5 parts by weight, based on 100 parts by weight of the component-(A).

The composition comprising the components (A), (B) and (C) but not containing the component (D) exhibits relatively week adhesion to a substrate just after curing by irradiation with a radiation; therefore the resulting cured product can be pealed from the substrate. For this, the composition is suitable for uses in which repair is required. In uses where strong adhesion to a substrate immediately after curing is required, addition of the component (D) realizes a cured product exhibiting a strong adhesion immediately after curing.

Other Components

In the present composition, other components may optionally be mixed in addition to the above components, so long as the object and effect of the present invention is not damaged. Such components may include various additives used to appropriately control, e.g., the shrinkage factor at the time of curing and the coefficient of thermal expansion, mechanical strength, thermal resistance, chemical resistance, frame-retardant properties, coefficient of flame expansion and gas permeability of the resultant cured products. Stated specifically, they may include, e.g., inorganic fillers such as fumed silica, silica aerogel, quarts powder, glass fibers, iron oxide, titanium oxide, calcium carbonate and magnesium carbonate; and polymerization inhibitors (pot-life extenders) such as hydroquinone and methoxyhydroquinone.

Preparation and Curing of Compositions

The composition of the present invention can be obtained by blending the above components (A) to (D) and optionally the other additives.

The composition thus obtained is immediately curable upon irradiation by radiations to provide a rubber-like elastic material. The radiations may include ultraviolet rays, far-ultraviolet rays, electron beam, X-rays, γ-rays, etc. Preferred are ultraviolet rays in view of simplicity of devices and easiness in handling. A light source to emit the ultraviolet rays may include a high-pressure mercury lamp, an ultrahigh-pressure mercury lamp, a metal halide lamp, a carbon arc lamp and a xenon lamp. With regard to the dose of radiations, for example, UV rays (peak: 320 to 390 nm) may be applied in a dose of from 200 to 2,400 mJ/cm$^2$, and preferably from 400 to 1,600 mJ/cm$^2$, for a thickness of 2 mm. The composition is curable in a short time upon irradiation by ultraviolet rays.

Uses

The cured product obtained using the composition of the present invention has a superior adhesion to substrates of silicon, silicon oxide film, glass, aluminum, polyimide films (e.g., Kapton (trade name, product of du Pont)), polycarbonate or glass epoxy. Thus, the composition of the present invention is useful as a sealing medium for electronic parts (e.g., liquid-crystal display devices) and a coating material for various electronic parts including electronic parts packaged circuits such as hybrid ICs on which no high-temperature treatment can be made. Making a curing process short, an improvement of productivity can be expected.

EXAMPLES

The present invention will now be described by giving Examples. In the following Examples, "part(s)" refers to "part(s) by weight".

Example 1

Into a 1,000 ml reactor having a stirrer, a reflux condenser, a dropping funnel and a dry-air feeder, 571 g of an organopolysiloxane represented by the following average formula:

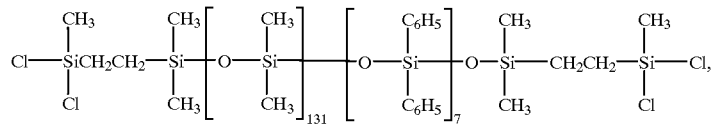

47 g of 2-hydroxy-1-acryloyloxy-3-methacryloyloxypropane (trade name: NK ESTER 701-A; available from Shin-Nakamura Chemical Co., Ltd.), 200 ml of toluene, 26 g of triethylamine and 2,000 ppm of a polymerization inhibitor dibutylhydroxytoluene were charged, and, after the temperature was raised to 70° C., these were heated for 7 hours with stirring. Thereafter, the reaction mixture was cooled and then filtered, and 4 g of propylene oxide was added to the filtrate obtained, followed by stirring for 1 hour at room temperature. Thereafter, the mixture obtained was subjected to stripping at 100° C./30 mmHg to obtain a transparent oily organopolysiloxane represented by the following formula:

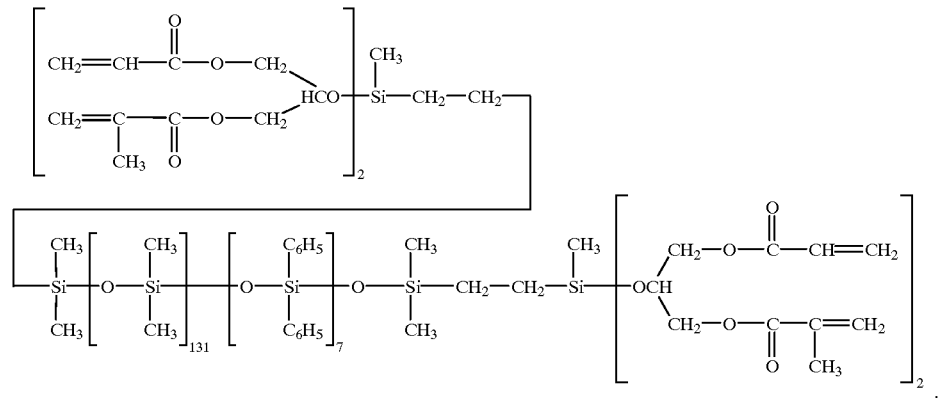

To 100 parts of this organopolysiloxane, 2 parts of 2-hydroxy-2-methyl-1-phenylpropan-1-one, 1 part of 2,4,6-trimethylbenzoyldiphenylphosphine oxide and 3 parts of tetramethoxysilane were added and mixed to obtain a radiation-curable organopolysiloxane composition.

This composition was cast into a mold of 1 mm deep, 120 mm wide and 170 mm long, and was irradiated by ultraviolet rays under conditions of the following ultraviolet ray irradiation condition 1 to cause the composition to photo-cure.

Irradiation condition 1: Irradiated for 2 seconds in a conveyor furnace having two metal halide mercury lamps of 80 W/cm$^2$ (amount of energy: 800 mJ).

Physical properties of the cured product thus obtained were measured according to JIS K6301. Its hardness was measured with a spring type model-A tester. Results obtained are shown in Table 1.

The composition was also coated on silicon, silica, glass, aluminum, Polyimide film (Kapton) and polycarbonate substrates each in an area of 4 cm$^2$ in a thickness of 2 mm, followed by irradiation under the above irradiation conditions 1 to effect curing. Adhesion of the resultant cured film to each substrate on the lapse of 16 hours after curing was measured in the following way. Results obtained are also shown in Table 1 together.

Adhesion evaluation method

One end of the cured film was held with a pair of tweezers to try peeling the film. Whether or not the film was peelable and how it stood peeled were evaluated by the following three ranks.

A: Adhering completely, and not peelable (percentage of cohesive failure: 90% or more).

B: Partly peelable (percentage of cohesive failure: 20% to less than 90%).

C: Completely peelable (percentage of cohesive failure: less than 20%).

To examine storage stability of the composition, the composition was left at each temperature of 5° C. and 25° C., and any changes in viscosity with time were measured. Results obtained are shown in Table 2.

Example 2

A composition was prepared in the same manner as in Example 1 except that the tetramethoxysilane was replaced with a partial hydrolysis-condensation product of tetramethoxysilane represented by the following formula (a methoxysiloxane oligomer). This composition was tested in the same manner as in Example 1. Results obtained are shown in Tables 1 and 2.

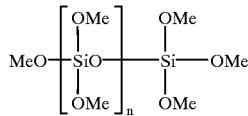

wherein n is an integer of 1 to 7.

Example 3

A composition was prepared in the same manner as in Example 1 except that the tetramethoxysilane was replaced with a partial hydrolysis-condensation product of tetraethoxysilane represented by the following formula (an ethoxysiloxane oligomer). This composition was tested in the same manner as in Example 1. Results obtained are shown in Tables 1 and 2.

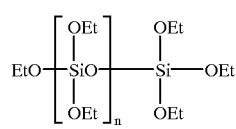

wherein n is an integer of 1 to 7.

Comparative Example 1

A composition was prepared in the same manner as in Example 1 except that the tetramethoxysilane was replaced with trimethoxysilane. This composition was tested in the same manner as in Example 1. Results obtained are shown in Tables 1 and 3.

Comparative Example 2

A composition was prepared in the same manner as in Example 1 except that the tetramethoxysilane was replaced with γ-acryloyloxypropyltrimethoxysilane. This composition was tested in the same manner as in Example 1. Results obtained are shown in Tables 1 and 3.

Comparative Example 3

A composition was prepared in the same manner as in Example 1 except that the tetramethoxysilane was replaced with a partial hydrolysis-condensation product of methyltrimethoxysilane represented by the following formula (a methyl-containing methoxysiloxane oligomer). This composition was tested in the same manner as in Example 1. Results obtained are shown in Tables 1 and 3.

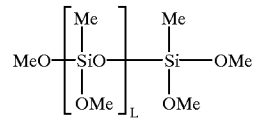

wherein L is an integer of 1 to 7.

TABLE 1

| | Example 1 | Example 2 | Example 3 | Comparative Example 1 | Comparative Example 2 | Comparative Example 3 |
|---|---|---|---|---|---|---|
| UV irradiation conditions: | 800 mJ (In N$_2$) | 800 mJ (In N$_2$) | 800 mJ (In N$_2$) | 800 mJ (In N$_2$) | 800 mJ (In N$_2$) | 800 mJ (In N$_2$) |
| Cured product physical properties: | | | | | | |
| Hardness (JIS A) | 51 | 50 | 49 | 50 | 51 | 50 |
| Elongation (%) | 60 | 70 | 70 | 60 | 60 | 60 |
| Tensile strength (kg/cm$^2$) | 17.5 | 17.5 | 18.0 | 17.0 | 17.0 | 17.5 |
| Adhesion*: | | | | | | |
| Silicon | A | A | A | A | B | C |
| SiO$_2$ | A | A | A | A | B | B |
| Glass | A | A | A | A | C | B |
| Aluminum | A | A | A | B | C | C |
| Kapton | A | A | A | B | C | C |
| Polycarbonate | A | A | A | B | C | C |

*Measured after leaving for 16 hours after curing.

TABLE 2

|  | Example 1 | | Example 2 | | Example 3 | |
| --- | --- | --- | --- | --- | --- | --- |
|  | Viscosity | Appearance | Viscosity | Appearance | Viscosity | Appearance |
| Initial stage | 8.0 | No change | 8.1 | No change | 8.1 | No change |
| 25° C./10 days | 8.0 | No change | 8.1 | No change | 8.1 | No change |
| 25° C./20 days | 8.1 | No change | 8.1 | NO change | 8.1 | No change |
| 25° C./30 days | 8.1 | No change | 8.1 | No change | 8.2 | No change |
| 25° C./40 days | 8.2 | No change | 8.2 | No change | 8.2 | No change |
| 25° C./50 days | 8.3 | No change | 8.2 | No change | 8.4 | No change |
| 5° C./10 days | 8.0 | No change | 8.0 | No change | 8.0 | No change |
| 5° C./20 days | 8.1 | No change | 8.1 | No change | 8.0 | No change |
| 5° C./30 days | 8.0 | No change | 8.1 | No change | 8.0 | No change |
| 5° C./40 days | 8.0 | No change | 8.1 | No change | 8.1 | No change |
| 5° C./50 days | 8.0 | No change | 8.1 | No change | 8.2 | No change |

TABLE 3

|  | Comparative Example 1 | | Comparative Example 2 | | Comparative Example 3 | |
| --- | --- | --- | --- | --- | --- | --- |
|  | Viscosity | Appearance | Viscosity | Appearance | Viscosity | Appearance |
| Initial stage | 8.1 | No change | 8.1 | No change | 8.1 | No change |
| 25° C./10 days | 9.0 | $H_2$ gas generated | 8.1 | No change | 8.1 | No change |
| 25° C./20 days | — | — | 8.2 | No change | 8.1 | No change |
| 25° C./30 days | — | — | 8.2 | No change | 8.2 | No change |
| 25° C./40 days | — | — | 8.2 | No change | 8.1 | No change |
| 25° C./50 days | — | — | 8.3 | No change | 8.1 | No change |
| 5° C./10 days | 8.1 | No change | 8.0 | No change | 8.2 | No change |
| 5° C./20 days | 8.3 | $H_2$ gas generated | 8.1 | No change | 8.1 | No change |
| 5° C./30 days | — | — | 8.1 | No change | 8.1 | No change |
| 5° C./40 days | — | — | 8.1 | No change | 8.1 | No change |
| 5° C./50 days | — | — | 8.2 | No change | 8.1 | No change |

Example 4

A radiation-curable organopolysiloxane composition was prepared in the same manner as in Example 1 except that a titanium compound having an alkoxychelate represented by the following formula was added and mixed in an amount of 0.1 part.

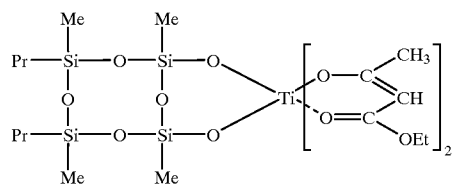

This composition was cured in the same manner as in Example 1, and physical properties of the cured product obtained were measured in the same manner as in Example 1. Results obtained are shown in Tables 4 and 5.

The composition was also coated on silicon, silica, glass, aluminum, Polyimide film (Kapton) and polycarbonate substrates each in an area of 4 cm$^2$ in a thickness of 2 mm, followed by irradiation under the above irradiation conditions 1 to effect curing. Adhesion of the resultant cured film to each substrate immediately after curing, on the lapse of 4 hours after curing and on the lapse of 16 hours after curing was measured in the same manner as in Example 1. Results obtained are shown in Tables 4 and 5 together.

Example 5

A composition was prepared in the same manner as in Example 4 except that the titanium compound used therein, having an alkoxychelate was replaced with 0.1 part of tetraisopropyl titanate, and was tested in the same manner as in Example 4.

Example 6

A composition was prepared in the same manner as in Example 4 except that the titanium compound used therein, having an alkoxychelate was replaced with 0.1 part of a titanium compound having an alkoxychelate represented by the following formula was added in an amount of 0.1 part.

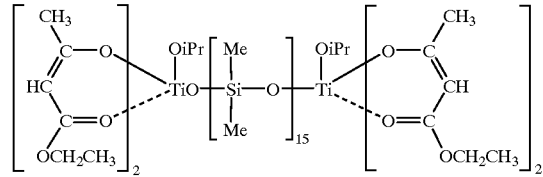

Comparative Example 4

A composition was prepared in the same manner as in Example 4 except that 3 parts of the tetramethoxysilane used therein was replaced with 3 parts of a partial hydrolysis-condensation product of methyltrimethoxysilane represented by the following formula (a methyl-containing methoxysiloxane oligomer). This composition was tested in the same manner as in Example 4.

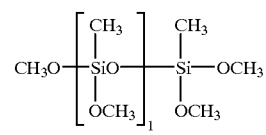

wherein 1 is an integer of 0 to 7.

Comparative Example 5

A composition was prepared in the same manner as in Example 4 except that 3 parts of the tetramethoxysilane used therein was replaced with 3 parts of γ-acryloyloxypropyltrimethoxysilane. This composition was tested in the same manner as in Example 4.

Comparative Example 6

A composition was prepared in the same manner as in Example 4 except that 3 parts of the tetramethoxysilane used therein was replaced with 3 parts of a partial hydrolysis-condensation product of trimethoxysilane represented by the following formula (a SiH-containing methoxysiloxane oligomer). This composition, however, increased in viscosity, became turbid and caused bubbling of $H_2$ gas a few hours after leaving at normal temperature, and hence was not able to be tested as in Example 4.

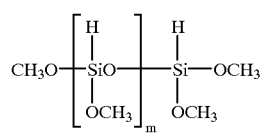

wherein m is an integer of 0 to 7.

Results obtained in Examples 5 and 6 and Comparative Examples 4 and 5 are also shown in Tables 4 and 5.

TABLE 4

| | | Physical properties | | |
|---|---|---|---|---|
| | UV irradiation conditions | Hardness (JIS-A) | Elongation (%) | Tensile strength (kg/cm$^2$) |
| Example 4 | 800 mJ(In N$_2$) | 50 | 65 | 18.0 |
| Example 5 | 800 mJ(In N$_2$) | 50 | 70 | 17.0 |
| Example 6 | 800 mJ(In N$_2$) | 49 | 70 | 17.0 |
| Comparative Example 4 | 800 mJ(In N$_2$) | 49 | 65 | 18.0 |
| Comparative Example 5 | 800 mJ(In N$_2$) | 50 | 65 | 17.0 |

TABLE 5

| | Adhesion | | | | | |
|---|---|---|---|---|---|---|
| Measured after: | Si | SiO$_2$ | glass | Alu- minum | Nickel- kapton | coated |
| Example 4 | | | | | | |
| Immediately: | A | A | A | A | A | A |
| 4 hours: | A | A | A | A | A | A |
| 16 hours: | A | A | A | A | A | A |
| Example 5 | | | | | | |
| Immediately: | A | A | A | A | A | A |
| 4 hours: | A | A | A | A | A | A |
| 16 hours: | A | A | A | A | A | A |
| Example 6 | | | | | | |
| Immediately: | A | A | A | A | A | A |
| 4 hours: | A | A | A | A | A | A |
| 16 hours: | A | A | A | A | A | A |
| Comparative Example 4 | | | | | | |
| Immediately: | C | C | C | C | C | C |
| 4 hours: | C | C | C | C | C | C |
| 16 hours: Comparative Example 5 | C | C | A | C | C | C |
| Immediately: | C | C | C | C | C | C |
| 4 hours: | C | C | C | C | C | C |
| 16 hours: | C | C | C | C | C | C |

What is claimed is:

1. A radiation-curable silicone rubber composition comprising;

(A) an organopolysiloxane represented by the general formula (1):

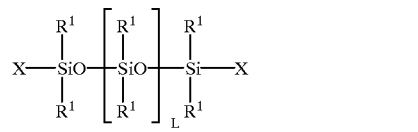

(1)

wherein R$^1$'s are independently a substituted or unsubstituted monovalent hydrocarbon group having 1 to 9 carbon atoms; and X's are independently an organosilicon group represented by the general formula (2):

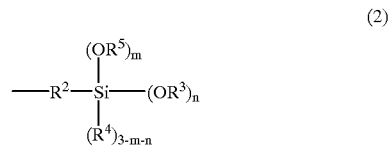

(2)

wherein R$^2$ is a divalent hydrocarbon group having 2 to 4 carbon atoms or an oxygen atom; R$^3$ is a monovalent organic group having 4 to 25 carbon atoms, having 1 to 3 acryloyl or methacryloyl groups represented by the general formula:

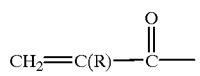

wherein R is a hydrogen atom or a methyl group; $R^4$ is a substituted or unsubstituted monovalent hydrocarbon group having 1 to 9 carbon atoms; $R^5$ is a monovalent hydrocarbon group having 1 to 18 carbon atoms; n is an integer of 1 to 3, m is an integer of 0 to 2, and 1>n+m>3, provided that $R^3$ has a plurality of acryloyl or methacryloyl groups when n is 1; L is an integer of 8 to 10,000; and $R^3$ (inclusive of R), $R^4$ and $R^5$ which are each present in plurality may each be same or different;

(B) a photosensitizer; and (C) at least one organosilicon compound selected from an alkoxysilane represented by the general formula: $Si(OR^6)_4$ wherein $R^6$ is an alkoxy-substituted or unsubstituted alkyl group having 1 to 4 carbon atoms; and a partial hydrolysis-condensation product thereof.

2. The composition according to claim 1, wherein in the general formula (1) 50 mol % or more of $R^1$'s is held by methyl groups and 25 mol % or less by phenyl groups.

3. The composition according to claim 1, wherein in the general formula (2) $R^3$ is an alkyl group having 2 or 3 acryloyloxy or methacryloyloxy groups.

4. The composition according to claim 3, wherein in the general formula (2) $R^3$ is an alkyl group with 1 to 10 carbon atoms having 3 acryloyloxy or methacryloyloxy groups.

5. The composition according to claim 3, wherein in the general formula (2) $R^3$ is a group represented by the formula:

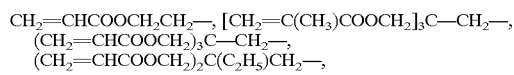

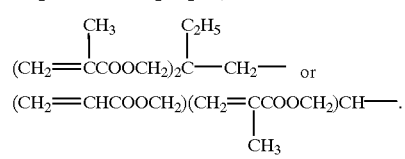

6. The composition according to claim 1, wherein in the general formula (2) 50 mol % or more of $R^4$ is held by methyl groups and 25 mol % or less by phenyl groups.

7. The composition according to claim 1, wherein in the general formula (1) L is an integer of 48 to 1,000.

8. The composition according to claim 1, wherein the component-(A) organopolysiloxane is at least one organopolysiloxane represented by the following general formula:

(1-1)

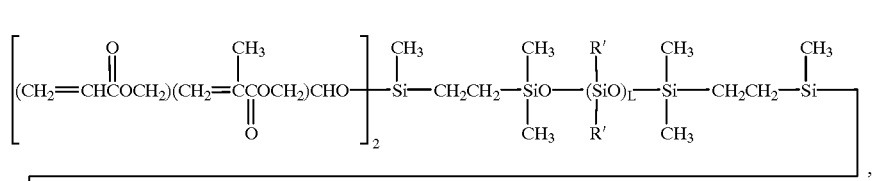

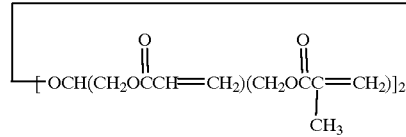

(1-2)

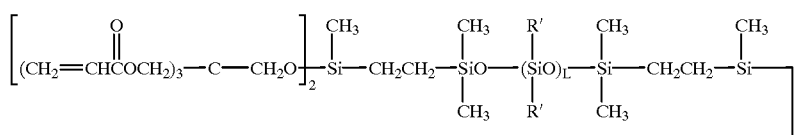

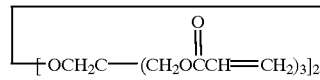

(1-3)

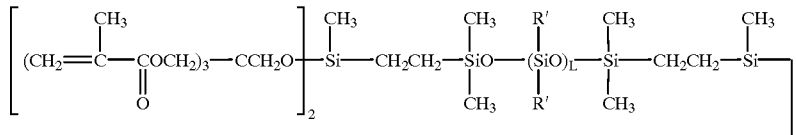

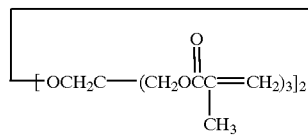

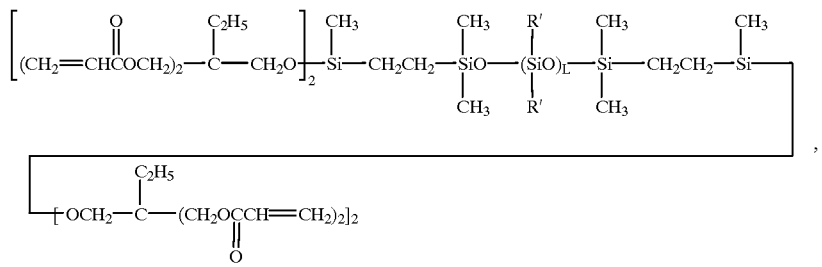
(1-4)
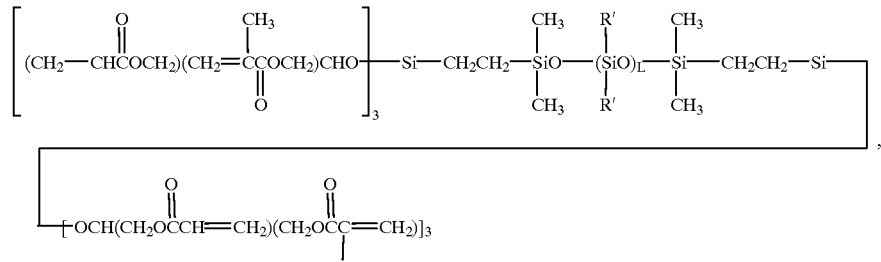
(1-5)
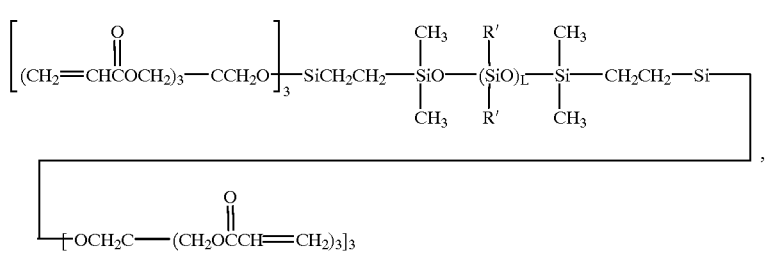
(1-6)
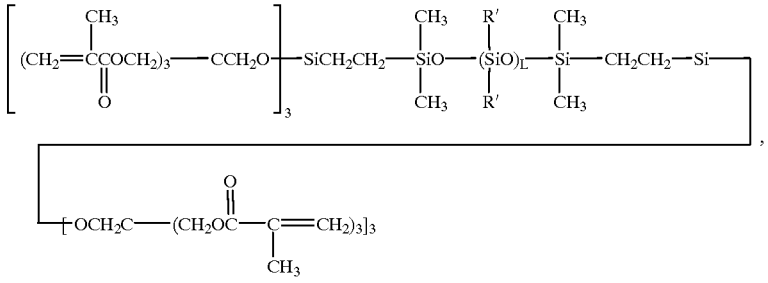
(1-7)
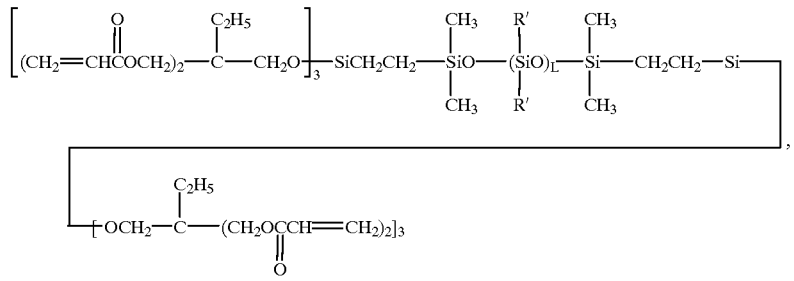
(1-8)
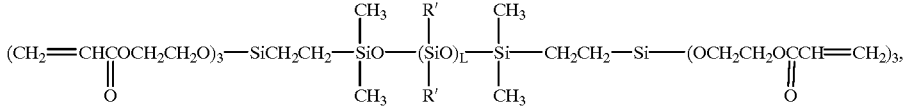
(1-9)

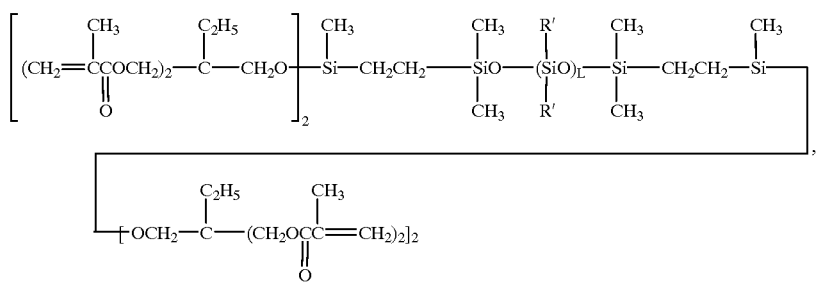
(1-10)
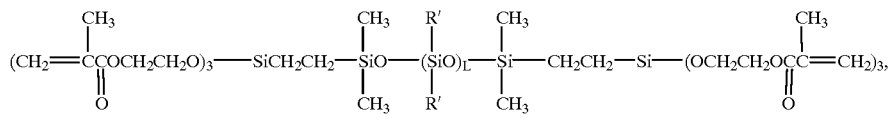
(1-11)
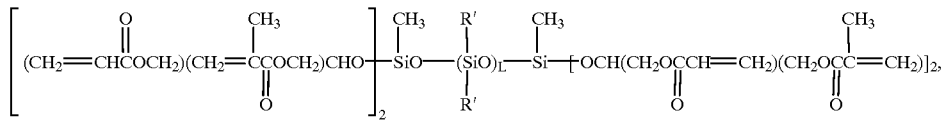
(1-12)
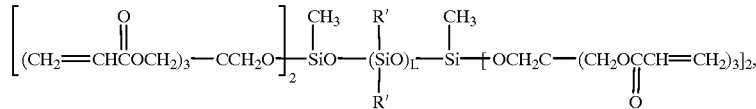
(1-13)
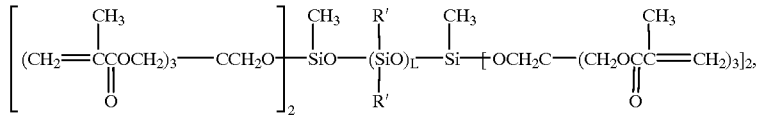
(1-14)
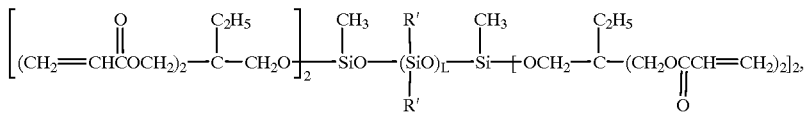
(1-15)
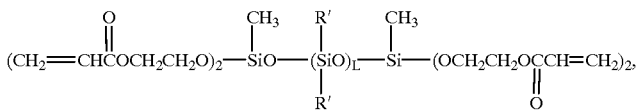
(1-16)
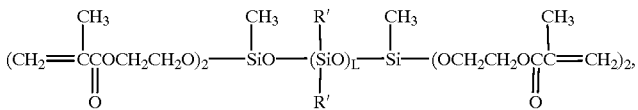
(1-17)
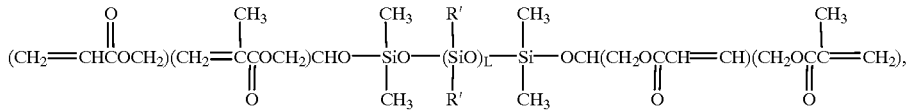
(1-18)
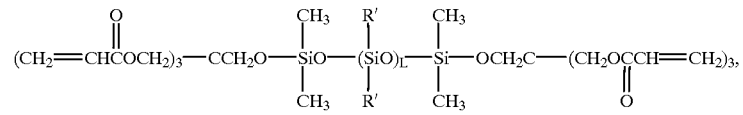
(1-19)

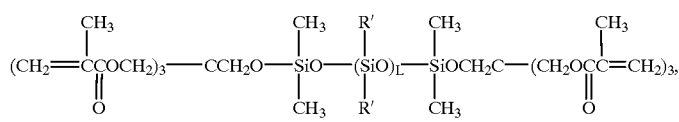

(1-20)

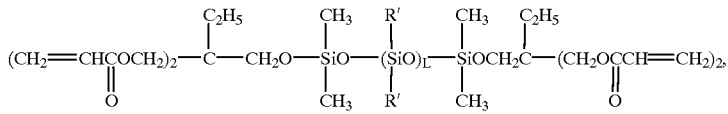

(1-21)

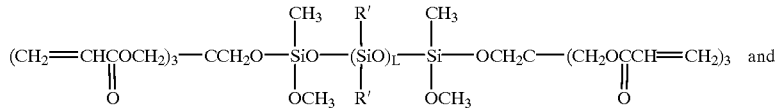

(1-22)

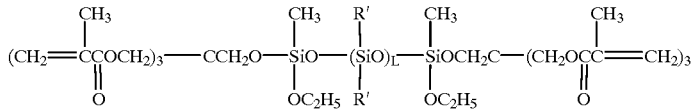

(1-23)

wherein in the formulas (1-1) to (1-23) R' represents a methyl group, phenyl group or 3,3,3-trofuluoropropyl group, and L is an integer of 8 to 10,000.

9. The composition according to claim 1, wherein the component-(B) photosensitizer is selected from the group consisting of 2-hydroxy-2-methyl-1-phenylpropan-1-one, 1-(4-isopropylphenyl)-2-hydroxy-2-methylpropan-1-one, 2,4,6-trimethylbenzoyldiphenylphosphine oxide, bisacylphosphine oxide and (2,6-dimethoxybenzoyl)-2,4,4-trimethylpentylphosphine oxide.

10. The composition according to claim 1, wherein in the formula: $Si(OR^6)_4$, representing the component-(C) alkoxysilane, $R^6$ is at least one of a methyl group and an ethyl group.

11. The composition according to claim 1, wherein the component-(C) partial hydrolysis-condensation product of the alkoxysilane is a siloxane compound having two or more alkoxyl groups.

12. The composition according to claim 1, which further comprises (D) at least one organic titanium compound selected from a titanate compound and a titanium chelate compound.

13. The composition according to claim 12, wherein said organic titanium compound comprises at least one of a titanate having an alkoxyl group having 1 to 8 carbon atoms or a titanate having a triorganosiloxyl group.

14. The composition according to claim 12, wherein said organic titanium compound comprises a compound selected from the group consisting of tetramethyl titanate, tetraethyl titanate, tetrapropyl titanate, tetraisopropyl titanate, tetrabutyl titanate, tetraisobutyl titanate, tetrahexyl titanate and tetra(2-ethylhexyl) titanate, $(n-C_3H_7O)_3TiOSi(CH_3)(OC_3H_7)_2$, $(n-C_3H_7O)_3TiOSi(CH_3)_2(OC_3H_7)$, $[(CH_3)_3SiO]_3TiOSi(CH_3)_2(OC_3H_7)_2$, and $[(CH_3)_3SiO]_4Ti$.

15. The composition according to claim 12, wherein said organic titanium compound is a complex having an acetylacetonato group as a ligand, a complex having a methyl acetate group or ethyl acetate group having an alkoxyl group in the ligand, and a salt of any of these complexes with an organosiloxane.

16. The composition according to claim 12, wherein said organic titanium compound is selected from the group consisting of compounds represented by the following formulas:

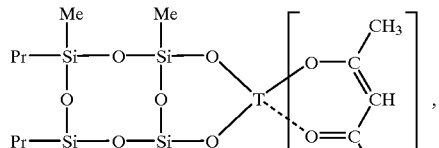

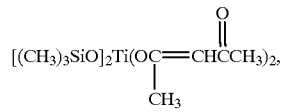

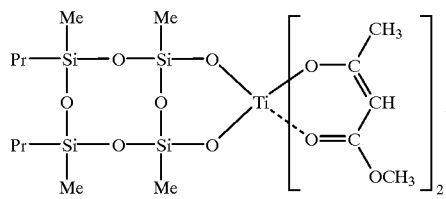

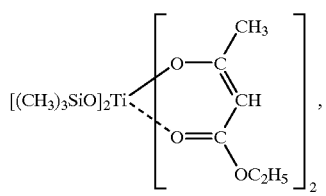

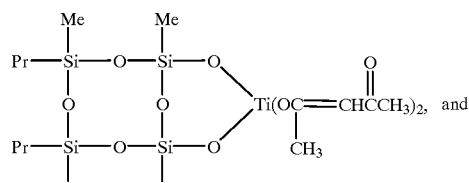

-continued

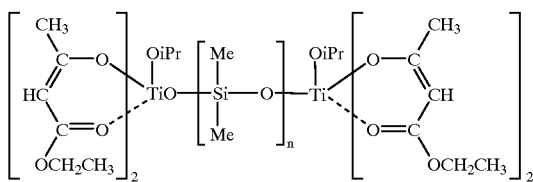

wherein n is an integer of 2 to 100. in the above formulas, Me, Et, Pr and iPr represent a methyl group, an ethyl group, a propyl group and an isopropyl group, respectively.

17. The composition according to claim 1, wherein said component-(B) is present in an amount of from 0.5 part by weight to 10 parts by weight and said component-(C) in an amount of from 0.5 part by weight to 10 parts by weight, based on 100 parts by weight of the component-(A).

18. The composition according to claim 12, wherein said component-(B) is present in an amount of from 0.5 part by weight to 10 parts by weight, said component-(C) in an amount of from 0.5 part by weight to 10 parts by weight and said component-(D) in an amount of from 0.001 part by weight to 20 parts by weight, based on 100 parts by weight of the component-(A).

19. A cured product obtained by irradiating the composition according to claim 1 by radiations to cause it to cure.

20. A cured product obtained by irradiating the composition according to claim 12 by radiations to cause it to cure.

* * * * *